United States Patent
Dath et al.

(10) Patent No.: US 7,294,604 B2
(45) Date of Patent: Nov. 13, 2007

(54) HYDROGENATION AND DEHYDROGENATION PROCESSES AND CATALYSTS THEREFOR

(75) Inventors: Jean-Pierre Dath, Beloeil (BE); Walter Vermeiren, Houthalen (BE)

(73) Assignee: Total Petrochemicals Research Feluy, Feluy (BE)

( * ) Notice: Subject to any disclaimer, the term of this patent is extended or adjusted under 35 U.S.C. 154(b) by 0 days.

(21) Appl. No.: 10/484,417

(22) PCT Filed: Jul. 16, 2002

(86) PCT No.: PCT/EP02/07947

§ 371 (c)(1), (2), (4) Date: Jul. 6, 2004

(87) PCT Pub. No.: WO03/008519

PCT Pub. Date: Jan. 30, 2003

(65) Prior Publication Data

US 2004/0232049 A1    Nov. 25, 2004

(30) Foreign Application Priority Data

Jul. 18, 2001  (EP) .................................. 01202732

(51) Int. Cl.
*B01J 21/06* (2006.01)

(52) U.S. Cl. ........................ 502/250; 502/240; 502/241; 502/243; 502/244; 502/251; 502/253; 502/254; 502/255; 502/256; 502/258; 502/259; 502/260; 502/261; 502/262; 502/439

(58) Field of Classification Search ................. 502/240, 502/241, 243, 244, 250, 251, 253, 254, 255, 502/256, 258, 259, 260, 261, 262, 439
See application file for complete search history.

(56) References Cited

U.S. PATENT DOCUMENTS

| | | | | |
|---|---|---|---|---|
| 3,095,461 | A | * | 6/1963 | Wilkes ....................... 585/530 |
| 3,316,116 | A | * | 4/1967 | Podschus ..................... 106/470 |
| 3,729,429 | A | | 4/1973 | Robson |
| 3,804,652 | A | | 4/1974 | Laidler et al. |
| 3,806,585 | A | | 4/1974 | Takahashi et al. |
| 3,915,725 | A | | 10/1975 | Takahashi |
| 3,928,539 | A | | 12/1975 | Satoh et al. |
| 4,298,386 | A | | 11/1981 | Kubo et al. |
| 4,689,315 | A | | 8/1987 | Anton et al. |
| 4,849,195 | A | | 7/1989 | Anton et al. |
| 5,155,084 | A | | 10/1992 | Horn et al. |

FOREIGN PATENT DOCUMENTS

JP            63248426         10/1988

* cited by examiner

*Primary Examiner*—Elizabeth D. Wood
(74) *Attorney, Agent, or Firm*—William D. Jackson; Shirley A. Kopecky

(57) ABSTRACT

A process for hydrogenating unsaturations in petrochemical feedstocks, the process comprising contacting the petrochemical feedstock, including at least one component having unsaturations, and hydrogen with a catalyst comprising at least one Group Ia, Ib, IIb, VIb, VIIb or VIII metal on a support of a crystalline calcium silicate having a surface area of at least 30 m2/g, the support being in the form of substantially spherical particles having a mean diameter of from 10 to 200 microns and pores in the particles having a diameter of from 100 to 2000 Angstroms, at a temperature of from 0 to 550° C. and a pressure of from 3 to 150 barg.

6 Claims, No Drawings

HYDROGENATION AND DEHYDROGENATION PROCESSES AND CATALYSTS THEREFOR

The present invention relates to a process for hydrogenating unsaturated petrochemical feedstocks, in particular a process for the selective hydrogenation of such feedstocks. The present invention also relates to a process for dehydrogenating petrochemical feedstocks. The present invention also relates to a catalyst, in particular a catalyst for use in such a process.

There are a number of known processes for the hydrogenation of unsaturated hydrocarbons. For most applications, the hydrogenation must be carried out in a selective manner, i.e. some unsaturated hydrocarbons have to be hydrogenated while other unsaturated hydrocarbons may not be hydrogenated. Among the pure hydrocarbons, three kinds of unsaturated hydrocarbons can be considered: (1) multiple unsaturated hydrocarbons are alkynes with triple bonds, diolefins with two double bonds or even multiple olefins with more double bonds; (2) unsaturated hydrocarbons with only one double bond; and (3) aromatic unsaturated hydrocarbons, having an aromatic nucleus. Selective hydrogenation means that only one or two of the three unsaturates are reduced. Very important industrial applications of hydrogenation are: (1) removal of impurities from steam cracker product streams, for example selective hydrogenation of multiple unsaturated hydrocarbons in olefin rich streams, or selective hydrogenation of multiple unsaturates and unsaturated hydrocarbons from aromatic rich streams, and (2) hydrogenation of macromolecules, for example hydrocarbon solvents and base oils, polyalpha-olefins and even resins, polymers and copolymers.

Heterogeneous hydrogenation catalysts contain an active metal compound or a carrier.

Among the active metal compounds are Group VIb, VIIb and VIII element compounds. They can be in the metallic state, in an oxidic state, in a partially reduced oxide state or even in a sulphided or partially sulphided state. Also metallic Group Ia metals are known to be active hydrogenation catalysts. The most preferred metals or metal compounds are those of Pd, Pt, Ni, Rh, Co, Fe, Cu, Ir, Ru, Os, W, Mo and Na or K. All these active hydrogenation catalysts can also exhibit isomerisation activity to some extent. It is known that in particular Na, K, Fe, Pd and Ni metals catalyse double bond migration, while Pt and Cu are much less active isomerisation catalysts. Activity and selectivity of selective hydrogenation catalysts can still further be improved by employing bimetallics or bimetallic compounds. Typical examples are CoMo, NiW and NiMo sulphided catalysts used for hydrotreatment. Other examples used for selective hydrogenation are: Cu—Pd, Cu—Ni, Cu—Co, Cu—Pt, Fe—Pd, Co—Pd, Ni—Pd, Pt—Pd, Ag—Pd, Fe—Pt, Ni—Pt, Pt—Sn, Pt—Pb, Pd—Sn, Pd—Pb, Au—Pd and many others.

It is known that activity and selectivity can also be influenced by the characteristics of the carrier for the metal compound. The carrier can influence the dispersion of the metal or metal compound, the particle size of the metal of metal compound and the electronic properties of the metal or metal compound.

Known carriers include carbon, alumina, silica, titania, zirconia, salts or alkaline earth metals and zeolites or molecular sieves. The acid-base properties of the carrier can be very important for several reasons. The carrier properties can influence the dispersion of the metal or metal compound, its electronic properties and hence its activity and selectively. Moreover, when the carrier is not completely covered with metal or metal compound, the remaining acid and/or basic sites may influence the catalytic behaviour of the catalyst. When highly unsaturated hydrocarbons are to be hydrogenated, they will interact strongly with acidic carriers whereas they will interact little with basic carriers. Even when hydrogenation needs high temperature, site reactions such as acid catalysed isomerisation or cracking can occur. It is known that addition of basic compounds during hydrogenation or adding basic metal compounds on the carrier do increase catalytic performance. Known basic carriers are salts of alkaline earth metals. However, they develop only very low surface areas.

A number of catalysts for selective hydrogenation of unsaturated hydrocarbons are available commercially. Such catalysts comprise, for example palladium on an alumina support, palladium on an activated carbon support, nickel tungsten on an alumina support and palladium on a barium sulphate support.

In complete contrast to the hydrogenation process, it is also known to dehydrogenate hydrocarbons. For example, it is known in the art that dehydrogenation catalysts for the dehydrogenation of light paraffins such as propane and butane primarily employ supported platinum, nickel or chromium. In such supported platinum catalysts, the platinum is present as a metal and is often promoted with tin. Chromium-based catalysts contain chromium oxide as the active phase. The nickel-based catalysts mainly employ nickel in the form of sulphide which is present on the support. For these three catalyst types it is known in the art that the carrier of the active phase has a very important effect on catalyst performance—the activity, the selectivity and the stability are all influenced by the support. Often, these three kinds of catalysts are supported on alumina-type carriers which have been modified by the addition of one or more alkali metal or alkaline earth metal compounds, which tend to moderate the acidity of the alumina in the carrier and hence increase the selectivity and the potential lifetime of the catalyst. On the other hand, the active metal compound may be supported on a spinel-like carrier such as $MgAl_2O_4$ or $ZrO_2$ which are less acidic than alumina-type carriers and which exhibit a high thermal stability. The property of high thermal stability is very important, since dehydrogenation reactions typically require a temperature of from 500 to 630° C.

Another catalytic dehydrogenation process is reforming which is a very important refinery application, in which the main goal is to dehydrogenate alkyl cycloparaffins into aromatics with co-production of hydrogen. Conventional reforming catalysts typically comprise platinum supported on an acidified alumina carrier. The acidic function is required when isomerisation and dehydrocyclisation are desired to convert additional paraffins into isomers and aromatics. There is an interest in the art to convert only paraffins with at least 6 carbon atoms into aromatic compounds with co-production of hydrogen. It is known in the art that this may be done over a catalyst comprising a basic zeolite carrier impregnated with platinum. Since there are no acidic sites associated with the basic zeolite carrier, competing reactions such as isomerisation and hydrocracking are suppressed, resulting in a very high selectivity for the production of aromatic compounds.

U.S. Pat. No. 5,155,084 discloses supported catalysts containing nickel, magnesium oxide and, if desired, further additives, which contain reduced Mg and Ni in a molar ratio of (0.0075 to 0.075):1. The catalysts also have an active nickel metal surface area of 110 to 180 square metres per gram of Ni and a BET total surface area of 160 to 450 square metres per gram. Suitable supports are various water-insoluble materials, including silicates, such as calcium silicates, magnesium silicates and/or aluminium silicates; alumina; silica and/or kieselguhr. The catalysts may be used for the hydrogenation of aliphatic and/or aromatic hydrocarbons.

A number of catalysts for selective hydrogenation of unsaturated hydrocarbons are available commercially. Such catalysts comprise, for example palladium on an alumina support, palladium on an activated carbon support, nickel tungsten on an alumina support and palladium on a barium sulphate support. Such catalysts suffer from the technical disadvantage of a low activity towards ethylenically unsaturated polymers, in other words with a relatively low hydrogenation of the cis and trans ethylenic unsaturations, and of the vinyl unsaturations.

However, there is a need in the art for improved dehydrogenation catalysts, and in particular carriers for such dehydrogenation catalysts.

A huge variety of naturally occurring and synthetically produced silicates are known in the art.

For example, U.S. Pat. No. 3,729,429 discloses layered complex metal silicate compositions, especially chrysotiles, and their preparation.

U.S. Pat. No. 3,806,585 discloses the production of a hydrous calcium silicate composed preponderantly of xonotlite in the shape of rod crystals which is described as having outstanding refractory properties, whereby moulded bodies comprised primarily of xonotlite provide strength unattained by other inorganic materials. The specification discloses that hydrous calcium silicate of the xonotlite type has use in construction as a fire proof coating material, as a fire proof moisture retaining material and as a potential filler for plastics and rubber products.

U.S. Pat. No. 3,804,652 discloses a method of producing calcium silicate products, such as drain pipes and insulating material, to form tobermorite having the empirical formula $5CaO.6SiO_2.5H_2O$.

U.S. Pat. No. 3,928,539 discloses a method of producing hydrous calcium silicates such as xonotlite, tobermorite and the like.

U.S. Pat. No. 3,915,725 discloses a process for producing hollow spherical aggregates of xonotlite, which aggregates are employed to form shaped articles.

U.S. Pat. No. 4,298,386 discloses the production of globular secondary particles of the woolastonite group of calcium silicate crystals, including woolastonite and xonotlite.

U.S. Pat. No. 4,689,315 discloses the production of amorphous, approximately spherical silica particles obtained by the acidic hydrolysis of an approximately spherical synthetic calcium silicate. The resultant silica particles, obtained by such acid hydrolysis, are disclosed as being particularly suitable for use as catalyst support. The starting material may comprise spherical synthetic calcium silicates such as xonotlite, tobermorite and/or calcium silicate hydrate, which are then treated with an aqueous acid having a pH of from 0.6 to 3 to produce the resultant silica particles for use as a catalyst support.

U.S. Pat. No. 4,849,195 discloses synthetic substantially spherical crystal aggregates of xonotlite. The aggregates can be mixed with inert particles, for example to produce thermal insulation products. Alternatively, as for U.S. Pat. No. 4,689,315 described above, the aggregates of xonotlite can be used as starting material for acid extraction of calcium atoms in order to obtain silica.

JP-A-63 248426 (and its Derwent Accession No. 1988-334698 (XP-002184999) in the WPI Database) discloses that waste gases containing carbon monoxide and acidic substances are treated using structural elements based on calcium silicate at high temperature. The preferred calcium silicate is xonotlite, tobermorite, afwillite, foshagite, okenite, wollastonite, etc. and other oxidation catalysts such as Mn, Fe, Co, Ni, Ce, La, Zr, Pd, etc. may be added to the calcium silicate.

The present invention in one preferred aspect aims to provide an improved method of selectively hydrogenating unsaturated petrochemical feedstocks.

Accordingly, the present invention provides a process for hydrogenating unsaturations in petrochemical feedstocks, the process comprising contacting the petrochemical feedstock, including at least one component having unsaturations, and hydrogen with a catalyst comprising at least one Group Ia, Ib, IIb, VIb, VIIb or VIII metal on a support of a crystalline calcium silicate having a surface area of at least 30 $m^2/g$, the support being in the form of substantially spherical particles having a mean diameter of from 10 to 200 microns and pores in the particles having a diameter of from 100 to 2000 Angstroms, at a temperature of from 0 to 550° C. and a pressure of from 3 to 150 barg.

Preferably, the at least one petrochemical feedstock is passed-over the catalyst at an LHSV of from 1 to 100 $h^{-1}$.

The molar ratio of hydrogen to the at least one component having unsaturations to be selectively hydrogenated may be from 0.7 to 200.

The present invention also provides a process for hydrogenating unsaturations in petrochemical feedstocks, the process comprising contacting the petrochemical feedstock, including at least one component having unsaturations, and hydrogen with a catalyst comprising at least one Group Ia, Ib, IIb, VIb, VIIb or VIII metal on a support of a crystalline calcium silicate having the chemical composition $Ca_6Si_6O_{17}(OH)_2$.

The present invention further provides a catalyst comprising at least one Group Ia, Ib, IIb, VIb, VIIb or VIII metal on a crystalline calcium silicate support having a surface area of at least 30 $m^2/g$, the support being in the form of substantially spherical particles and pores in the particles having a diameter of from 100 to 2000 Angstroms.

Preferably, the particles have a mean diameter of from 10 to 200 microns.

The catalyst may be used, in accordance with the invention, in a process for hydrogenating an unsaturated hydrocarbon feedstock or in a process for dehydrogenating or reforming a hydrocarbon feedstock.

The present invention yet further provides a catalyst comprising a metal on a support comprising a crystalline calcium silicate of molecular formula $6CaO.6SiO_2.H_2O$ having a surface area of at least 30 $m^2/g$, the support being in the form of substantially spherical particles having a mean diameter of from 10 to 200 microns and pores in the particles having a diameter of from 100 to 2000 Angstroms.

Preferably, the metal comprises at least one metal selected from Groups Ia, Ib, IIb, VIb, VIIb and VIII of the periodic table.

The present invention still further provides the use of a crystalline calcium silicate of molecular formula $6CaO.6SiO_2.H_2O$ as a catalyst support having a surface area of at least 30 $m^2/g$, the support being in the form of substantially spherical particles having a mean diameter of from 10 to 200 microns and pores in the particles having a diameter of from 100 to 2000 Angstroms.

The present invention is at least partly predicated on the surprising discovery that a basic hydrated crystalline calcium silicate when used as a catalyst support can yield hydrogenation catalysts for selective hydrogenation of petrochemical feedstocks having high activity and selectivity. This is all the more surprising since xonotlite-type materials have been known for a number of years but to the applicant's knowledge there has been no disclosure or suggestion in the prior art of using xonotlite-type materials as catalysts or catalyst carriers. Rather, as disclosed in for example U.S. Pat. No. 4,689,315 as discussed above, xonotlite has been proposed in the prior art for use as a starting material for the production of silica, where the chemical composition and structure of the xonotlite is destroyed in the preparation of the silica particles by acid hydrolysis.

The present invention is also at least partly predicated on the surprising discovery that a basic hydrated crystalline calcium silicate comprising xonotlite is a suitable carrier for dehydrogenation and reforming reactions because at temperatures of up to 650° C., such a basic carrier has high temperature stability, in that the carrier retains its crystallinity and substantially retains its pore volume and surface area.

Preferred embodiments of the present invention will now be described in greater detail by way of example only.

The catalyst of the present invention preferably comprises a supported noble metal catalyst.

The catalyst of the present invention comprises at least one Group Ia, Ib, IIb, VIb, VIIb or VIII metal, such as Pd, Co, Rh, Ru, Ni, Mo, W, Fe, Cu, Na or K or a combination thereof with palladium being particularly preferred.

The metal or metals may be in the metallic state, in an oxidic state, in a partially reduced oxide state, or in a sulphided or partially sulphided state. Optionally, bi-metallic metals or bi-metallic compounds may be incorporated into the hydrogenation catalyst, such as CoMo, NiW, and NiMo sulphided catalyst for hydro-treatment and, for selective hydrogenation, Cu—Pd, Cu—Ni, Cu—Co, Cu—Pt, Fe—Pd, Co—Pd, Ni—Pd, Pt—Pd, Ag—Pd, Fe—Pt, Ni—Pt, Pt—Sn, Pt—Pb, Pd—Sn, Pd—Pb and Au—Pd.

The preferred catalyst support is a basic calcium silicate with a very open and accessible pore structure. A most preferred catalyst support comprises a synthetic crystalline hydrated calcium silicate having a chemical composition of $Ca_6Si_6O_{17}(OH)_2$ which corresponds to the known mineral xonotlite (having a molecular formula $6CaO.6SiO_2.H_2O$). The catalyst support preferably has a spherical morphology with a mean diameter of the spherical particles being from 10 to 200 μm. The support has a very open structure comprising an outer shell with a very close-crystal structure surrounding an open inner structure. This may be referred to as an egg shell like structure. The outer shell is formed of interlocked ribbon-shaped crystals yielding regular and homogeneous surface properties. The outer shell is provided with pore openings up to 2000 Angstroms, more preferably from 100 to 1000 Angstroms, in diameter. This provides a good pore structure with high pore volume.

Preferably, the support has a specific surface area well above 10 $m^2/g$, ranging from 30 to 200 $m^2/g$, more preferably from 40 to 90 $m^2/g$.

The support material is preferably pH basic. More preferably, the support material has a minimum basicity corresponding to a pH of greater than 7.5. The pH may be measured when 4 wt % of the support material is immersed in water.

Generally, a synthetic hydrated calcium silicate is synthesised hydrothermally under autogeneous pressure. A particularly preferred synthetic hydrated calcium silicate is available in commerce from the company Promat of Ratingen in Germany under the trade name Promaxon D. This material exhibits some basicity due to the presence of calcium, and in a 4% by weight dispersion in water, the pH reaches a value of around 10. The specific composition of the preferred synthetic hydrated calcium silicate is specified in Table 1.

In order to demonstrate the thermal stability of xonotlite, and therefore the applicability of xonotlite as a carrier for dehydrogenation and reforming reactions, commercial xonotlite sold under the trade name Promaxon D was calcined in ambient air at a relative humidity of about 50% at two different temperatures, namely 650° C. and 750° C., each for a period of 24 hours. The initial xonotlite had a crystalline phase $Ca_6Si_6O_{17}(OH)_2$ with a BET surface area of 51 $m^2$/gram and a pore volume (of less than 100 nanometers) of 0.35 ml/gram. After calcination at 650° C., the carrier retained its crystallinity which corresponds to that of xonotlite. Thus after a 24 hour calcination at 650° C., the crystalline phase still comprised xonotlite ($Ca_6Si_6O_{17}(OH)_2$) with a BET surface area of 47.4 $m^2$/gram and a pore volume (less than 100 nanometers) of 0.30 ml/gram. After the calcination at 750° C., the carrier was transformed into wollastonite (having the crystalline phase $CaSiO_3$) by losing one water molecule. This made the carrier less basic. Furthermore, as a result of calcination at 750° C. the carrier lost much of its pore volume, being reduced to 0.09 ml/gram (for pore sizes of less than 100 nanometers) and the BET surface area was correspondingly reduced to 38 $m^2$/gram.

These results show that xonotlite has utility as a basic carrier for high temperature reactions in the range of from 500 to 650° C., more particularly from 500 to 630° C., the typical temperature range for dehydrogenation and reforming reactions. In these temperature ranges the xonotlite retains its basicity, resulting in the carrier being suitable for incorporation in a catalyst for use in reforming reactions.

The at least one Group Ia, Ib, IIb, VIb, VIIb or VIII metal is preferably present in an amount of from 0.01 to 10 wt %, more preferably about 0.5 wt %, based on the weight of the supported catalyst.

The catalyst is produced by impregnating the at least one Group Ia, Ib, IIb, VIb, VIIb or VIII metal on the calcium silicate support. Preferably, an incipient wetness impregnation technique is employed where the pores of the support are filled with a volume of solution containing the metal. In this technique, the dried catalyst is impregnated with a solution of a salt of the at least one Group Ia, Ib, IIb, VIb, VIIb or VIII metal, for example a halide of the metal, in particular the Group VIII metal chloride. The amount of the metal salt is calculated to provide a desired metal content on the support, for example a metal content of from 0.01 to 10 wt % based on the weight of the supported catalyst, most preferably about 0.5 wt % based on the weight of the supported catalyst. The impregnated solid is dried first under vacuum and subsequently at elevated temperature.

Finally, the product is calcined, for example at a temperature of about 250° C. for a period of about 3 hours.

Alternatively an excess of solution is used during the impregnation step and the solvent is removed by evaporation. Depending on the properties of the impregnation solution and the carrier the active metal phase can have different locations: (1) the metal or metal compound is concentrated in a thin layer close to the external surface, this may be referred to as an "egg-shell mode", (2) the metal or metal compound is concentrated in a thin layer below the surface, but not penetrating to the centre, this may be referred to as an "egg-white mode", (3) the metal or metal compound is concentrated in a small zone near the centre of the particle carrier, this may be referred to as an "egg-yolk mode", and (4) the metal or metal compound is uniformly distributed throughout the particle carrier. The way that the metal precursor will interact with the carrier depends on the isoelectric point (IEP) which is the pH at which the particle of the carrier in an aqueous solution has no net charge. At pH's above the IEP, cations will be adsorbed, because the surface carries a negative charge; below the IEP, only anions will be adsorbed, because the surface carries a positive charge. During the contact of the impregnating solution and the carrier, ion exchange can also occur. The impregnating solution may be altered by adding complexing agents, which can change the charge of the metal precursor. In another technique, competing ions may be added to improve the spreading of the metal precursor over the carrier.

In alternative embodiments of the catalyst production process, the metal may be deposited on the support by ion exchange or vapour phase deposition.

The catalyst of the present invention is a heterogeneous catalyst which may be used in a batch wise or continuous process. Preferably, the catalyst is used in a fixed bed reactor. A most preferred process employs a continuously operated fixed bed reactor.

In the hydrogenation process, the petrochemical feedstock is contacted batch-wise or continuously passed over the catalyst at a selected temperature and pressure. The temperature is preferably from 0 to 250° C. The total pressure is preferably from 3 to 50 bar. The petrochemical feedstock is preferably contacted with the catalyst at a liquid hourly space velocity (LHSV) of from 0.1 to 100 $h^{-1}$, more preferably from 1 to 100 $h^{-1}$.

The hydrogenation conditions vary dependent on the nature of the petrochemical feedstock and the process of the invention may be employed for hydrogenating a variety of different unsaturated petrochemical feedstocks. Fundamentally, the feedstocks are those to be selectively hydrogenated where one of two unsaturates is reduced or one or two of three unsaturates are reduced, the unsaturates being selected from multiple unsaturated hydrocarbons such as alkynes with triple bonds, diolefins with two double bonds or multiple olefins with more double bonds; unsaturated hydrocarbons with only one double bond; and aromatic unsaturated hydrocarbons having an aromatic nucleus.

In a first preferred aspect, the process is used for selective hydrogenation of butadiene to butenes in crude C4 streams. The C4 streams may come from an FCC unit, a visbreaker or a coker, or may comprise a C4 stream from a steam cracker or a C4 fraction of an ethylene plant. The C4 fraction of an ethylene plant contains high concentrations of butadiene (typically 25 to 75 wt %). It is desirable to hydrogenate such butadiene into butenes for further processing. Moreover, a C4 fraction from which the butadiene has been removed by conversion or extraction may still contain residual butadiene. Typically, in this preferred process the C4 stream containing butadiene is fed over the catalyst together with hydrogen so as to have a hydrogen/butadiene molar ratio of from 1 to 10, under process conditions comprising an inlet temperature of from 20 to 200° C., a total pressure of from 5 to 50 barg and an LHSV of from 1 to 40 $h^{-1}$. The reactor effluent may be recycled in order to control the outlet temperature. Optionally, several reactors in series may be used with intermittent cooling and/or injection of hydrogen for improved control of the hydrogen content in the feedstock.

In a second preferred aspect of the invention the process may be employed for selective hydrogenation of vinyl-and ethyl acetylenes in crude C4 streams. The C4 streams typically come from steam crackers. The C4 fraction from an ethylene plant contains, beside the butadiene discussed hereinabove, varying amounts of vinyl acetylene and ethyl acetylene. These have to be removed before further processing, such as by extraction or conversion. The feedstock is fed together with hydrogen over the catalyst, there being a hydrogen/butadiene molar ratio of from 1 to 10 under process parameters having an inlet temperature of from 0 to 100° C., a total pressure of from 3 to 35 barg and an LHSV of from 1 to 40 $h^{-1}$. Again, the reactor effluent may be recycled in order to control the outlet temperature and optionally several reactors in series may be used with intermittent cooling and/or injection of hydrogen for improved control of the hydrogen content in the feed.

In a third preferred aspect of the invention the process may be employed for selective hydrogenation of methyl acetylene and propadiene to propylene in C3 streams. The feedstock typically comprises a C3 cut from a steam cracking unit, which most typically is a C3 fraction with high propylene content which is obtained from an ethylene plant. This fraction contains methyl acetylene and propadiene. These compounds have to be removed for further processing of the propylene. In this aspect of the process, the feedstocks is fed together with hydrogen, at a hydrogen/MAPD molar ratio of from 0.7 to 5 (MAPD being the total molar content of methyl acetylene and propadiene) under process parameters comprising an inlet temperature of from 0 to 100° C., a total pressure of from 10 to 50 barg and an LHSV of from 10 to 50 $h^{-1}$. The reaction may be carried out in a multi-tubular pseudo-isothermal reactor or in an adiabatic reactor. As for the other preferred aspects, the reactor effluent may be recycled in order to control the outlet temperature and optionally several reactors in series may be used with intermittent cooling and/or injection of hydrogen in order to provide better control of the hydrogen content in the feedstock.

In accordance with a fourth preferred aspect of the invention, the process of the invention may be employed for the selective hydrogenation of pyrolysis gasoline, which may also be known in the art as "first stage" hydrogenation of the pyrolysis gasoline. The feedstock comprises pyrolysis gasoline from steam cracking units, coker units or visbreakers. In accordance with this aspect, diolefins and unsaturated aromatics are converted into the corresponding olefins and aromatics. The hydrogenated product can be used as a stable gasoline blending feed or can be further hydrotreated for the recovery of aromatics. The feedstock is passed over the catalyst together with hydrogen to provide a hydrogen/diene molar ratio of from 1 to 10 under the process parameters of an inlet temperature of from 20 to 200° C., a total pressure of from 5 to 50 barg and an LHSV of 1 to 20 $h^{-1}$. Again, as for the other aspects, the reactor effluent may be recycled in order to control the outlet temperature and optionally several reactors in series may be used with intermittent cooling and/or injection of hydrogen in order to achieve better control of the hydrogen content in the feedstock.

In a yet fifth preferred aspect of the invention the process of the invention is employed for selective hydrogenation of gasoline fractions. The feedstock may comprise fractions from pyrolysis gasoline originating from steam cracking units, coker units or visbreakers and light cracked naphthas from FCC units. In this aspect, dienes and acetylenes in the gasoline fractions are selectively removed for the preparation of ethers. The feedstock is passed over the catalyst together with hydrogen to provide a hydrogen/diene molar ratio of from 1 to 20, and the process parameters are an inlet temperature of from 20 to 250° C., a total pressure of from 5 to 50 barg and an LHSV of from 1 to 20 h$^{-1}$.

In a sixth preferred aspect of the invention, the process of the invention may be employed for selective hydrogenation of phenyl acetylene in crude styrene streams. The feedstock comprises crude styrene. Crude styrene production by dehydrogenation of ethyl benzene or recovery from pyrolysis gasoline tends to yield styrene containing small amounts of phenyl acetylene which has to be removed before further processing. The styrene is fed together with hydrogen to yield a hydrogen/phenyl acetylene molar ratio of from 1 to 20 over the catalyst at an inlet temperature of from 10 to 150° C., a total pressure of from 5 to 50 barg and an LHSV of from 10 to 100 h$^{-1}$.

In a seventh preferred aspect of the invention, the process of the invention is for selective hydrogenation of olefins in aromatic rich fractions. The feedstocks may comprise aromatic rich fractions from reforming units, from cokers or from steam cracking units. Such aromatic rich fractions need to be treated to extract the aromatics. Before the extraction of the aromatics, the residual bromine index (which reflects the olefin content) has to be very low. Any process to reduce the olefin content by hydrogenation needs to minimize the conversion of the aromatics. Also, a further reduction of the bromine index in almost pure aromatic fractions may require a further hydrogenation step which can replace conventional clay treatment. The feedstock is passed together with hydrogen over the catalyst at a hydrogen/olefins molar ratio of from 5 to 100 under process parameters comprising an inlet temperature of from 5 to 250° C., a total pressure of from 5 to 50 barg and an LHSV of from 5 to 50 h$^{-1}$.

In an eight preferred aspect of the present invention, the process of the invention may be employed for selective hydrogenation of petrochemical feedstocks in conjunction with a reforming process.

When the crystalline calcium silicate support (such as xonotlite) is used for a dehydrogenation or reforming catalyst, the catalyst, as well as the support, comprises at least one Group Ia, Ib, IIb, VIb, VIIb or VIII metal such as Pd, Co, Rh, Ru, Ni, Mo, W, Fe, Cu, Na or K or a combination thereof. The feedstocks for dehydrogenation may typically comprise light paraffins, such as propane and butane. The feedstocks for reforming reactions may typically comprise cycloparaffins, such as cyclohexane. The dehydrogenation and reforming reactions may be carried out at a temperature of from 500 to 630° C.

The present invention will now be described with reference to the following non-limiting Example.

EXAMPLE 1

Catalyst Preparation

Extrudates of the hydrated crystalline calcium silicate available in commerce under the Trade name Promaxon D was dried at a temperature of 500° C. for a period of 3 hours. The dried support was then impregnated with a solution of palladium chloride (PdCl$_2$) using a wet impregnation technique. In particular, 65.38 g of dried Promaxon D were progressively contacted with 38.23 mol of an aqueous palladium chloride solution, the amount of solution being selected so as to correspond to the estimated absorption capacity of the dried Promaxon D. The amount of the palladium salt was calculated in order to reach a final palladium content in the resultant catalyst of 0.3 wt %. The impregnated solid was dried under vacuum for a period of 36 hours at 25° C. and thereafter dried for a period of 16 hours at a temperature of 110° C. Finally, the catalyst was calcined at a temperature of 400° C. for a period of 3 hours.

Selective Hydrogenation of Pyrolysis Gasoline

An amount of 42.2 g (having a volume of 75 ml) of the activated catalyst comprising 0.3 wt % Pd on the xonotlite carrier was transferred under nitrogen into a laboratory scale continuous trickle bed reactor. The catalyst was then reduced under a flowing hydrogen stream at 120° C. Thereafter a pyrolysis gasoline from a steam cracker having the composition and properties specified in Table 2, was passed through the reactor at an LHSV of 4.92 h$^{-1}$ (corresponding to a weight hourly space velocity (WHSV) of 7.00 h$^{-1}$), constituting a mass flow rate of 296 g/h, together with hydrogen at a flow rate of 40.0 Nl/h. The hydrogen/diene molar ratio was 4.10. The total pressure was 30 bar and the inlet temperature was varied from about 45° C. to about 120° C.

The composition of the effluent of the reactor was analysed over the varying inlet temperatures and the results are summarised in FIG. 1.

From FIG. 1 it will be seen that for the aromatics content of the effluent, this was substantially unchanged as compared to the aromatics content of the feedstock. The olefins content was increased in the effluent as compared to that in the feedstock. However, the olefins content tended to decrease with increasing inlet temperature up to 120° C. For inlet temperatures of from about 45 to 80° C., the olefins content was about 17 wt %, decreasing gradually to about 14 wt % at an inlet temperature of 120° C. For the paraffins content, this was increased in the effluent as compared to the paraffins content of the feedstock. The paraffins content gradually increased with increasing inlet temperature. Thus at an inlet temperature of about 45° C. the paraffins content was about 27 wt %, increasing to a paraffins content of about 33 wt % at an inlet temperature of about 120° C. Most significantly, the dienes content of the effluent was significantly reduced as compared to that of the feedstock, and the dienes content of the effluent tended to decrease yet further with increasing inlet temperature. Thus at inlet temperatures of about 45° C., the dienes content was about 2 wt %, significantly less than the original dienes content of about 12 wt % and the dienes content of the effluent decreased to about 0.25 wt % at an inlet temperature of about 120° C.

The significant decrease in the dienes content of the effluent as compared to that of the feedstock, with a corresponding smaller increase in the paraffins and olefins content, and with the aromatics content being substantially unchanged, indicates the effectiveness of the selected hydrogenation catalyst of the present invention. Thus the catalyst is very active for the hydrogenation of dienes, and a good selectivity for olefins is maintained.

TABLE 1

| Composition | |
|---|---|
| SiO$_2$ | 49.0 wt % |
| CaO | 42.9 wt % |
| Al$_2$O$_3$ | 0.2 wt % |
| MgO | 0.3 wt % |
| Fe$_2$O$_3$ | 1.1 wt % |
| Na$_2$O | 0.2 wt % |
| K$_2$O | 0.2 wt % |
| Loss on Ignition | 6.1 wt % |
| Specific area (BET) | 50 m$^2$/g |

TABLE 1-continued

| Composition | |
|---|---|
| Bulk Density | 90 g/l |
| Average particle size | 45 μm |

TABLE 2

| Feedstock Composition | |
|---|---|
| Paraffins | 24.46 wt % |
| Olefins | 10.91 wt % |
| Dienes | 12.20 wt % |
| Aromatics | 52.43 wt % |
| Diene Value [gramI$_2$/100 gram] | 18.21 |
| Sulphur | 94 wppm |
| Density | 0.802 g/ml |

The invention claimed is:

1. A catalyst comprising at least one Group Ia, Ib, IIb, VIb or VIII metal impregnated on a crystalline calcium silicate support having a surface area of at least 30 m$^2$/g, the support being in the form of substantially spherical particles comprising pores in the particles having a diameter of from 100 to 2000 Angstroms.

2. A catalyst according to claim 1 wherein the calcium silicate has the chemical composition Ca$_6$Si$_6$O$_{17}$(OH)$_2$.

3. A catalyst according to claim 2 wherein the support has a basicity corresponding to a pH of greater than 7.5.

4. A catalyst comprising at least one Group Ia, Ib, IIb, VIb, VIb or VIII metal on a crystalline calcium silicate support having a surface area of at least 30m$^2$/g, the support being in the form of substantially spherical particles comprising pores in the particles having a diameter or from 100 to 2000 Angstroms, wherein the calcium silicate has the chemical composition Ca$_6$Si$_6$O$_{17}$(OH)$_2$ wherein the support has a basicity corresponding to a pH of greater than 7.5, and wherein the metal comprise palladium impregnated onto the support in an amount of from 0.01 to 101 wt. % based on a weight of the supported catalyst.

5. A catalyst comprising a metal impregnated on a support comprising a crystalline calcium silicate having a molecular formula 6CaO.6SiO$_2$.H$_2$O, a surface area of at least 30 m$^2$/g, the support being in the form of substantially spherical particles having a mean diameter of from 10 to 200 microns and having pores in the particles with a diameter of from 100 to 2000 Angstroms.

6. A catalyst according to claim 5 wherein the metal comprises at least one metal selected from Groups Ia, Ib, IIb, VIb, VIIb and VIII of the periodic table.

* * * * *